United States Patent
Kawata et al.

(10) Patent No.: US 11,272,172 B2
(45) Date of Patent: Mar. 8, 2022

(54) IMAGE PROCESSING APPARATUS, FAILURE DETECTION METHOD PERFORMED BY IMAGE PROCESSING APPARATUS, AND NON-TRANSITORY RECORDING MEDIUM

(71) Applicants: Atsushi Kawata, Kanagawa (JP); Yuuki Takahashi, Kanagawa (JP)

(72) Inventors: Atsushi Kawata, Kanagawa (JP); Yuuki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 16/720,329

(22) Filed: Dec. 19, 2019

(65) Prior Publication Data

US 2020/0213583 A1 Jul. 2, 2020

(30) Foreign Application Priority Data

Dec. 28, 2018 (JP) .............................. JP2018-248205

(51) Int. Cl.
  *H04N 17/00* (2006.01)
  *G06F 11/07* (2006.01)
  *G06T 7/00* (2017.01)
  *G06T 5/50* (2006.01)

(52) U.S. Cl.
  CPC ....... *H04N 17/002* (2013.01); *G06F 11/0706* (2013.01); *G06T 5/50* (2013.01); *G06T 7/0002* (2013.01)

(58) Field of Classification Search
  CPC . H04N 17/002; G06F 11/0706; G06T 7/0002; G06T 5/50; G06T 2207/30168
  See application file for complete search history.

(56) References Cited

U.S. PATENT DOCUMENTS

| | | | | |
|---|---|---|---|---|
| 5,107,254 A | * | 4/1992 | Choi | G09G 5/391 345/564 |
| 5,544,240 A | * | 8/1996 | Warren | H03M 1/1071 382/270 |
| 9,781,353 B2 | | 10/2017 | Takahashi | |
| 9,965,227 B2 | * | 5/2018 | Okamoto | G06F 3/121 |
| 2004/0135906 A1 | * | 7/2004 | Okada | H04N 1/32101 348/239 |
| 2006/0126956 A1 | * | 6/2006 | Lee | H04N 19/20 382/243 |

(Continued)

FOREIGN PATENT DOCUMENTS

| | | |
|---|---|---|
| JP | H11-088585 | 3/1999 |
| JP | 2017-092757 | 5/2017 |
| JP | 2018-005339 | 1/2018 |

*Primary Examiner* — Xuemei G Chen
(74) *Attorney, Agent, or Firm* — IPUSA, PLLC

(57) ABSTRACT

An image processing apparatus for execution of image processing on an input image is provided. The image processing apparatus includes a memory, and a processor coupled to the memory and configured to replace a partial image of a predetermined region within the input image with a test image, retain the partial image, detect presence or absence of a failure of the image processing apparatus based on the test image that has been subjected to the image processing, and replace the test image that has been subjected to the image processing with the retained partial image, after detecting the presence or absence of the failure.

6 Claims, 8 Drawing Sheets

(56) References Cited

U.S. PATENT DOCUMENTS

| | | | |
|---|---|---|---|
| 2006/0245644 A1* | 11/2006 | Whitman | G06K 9/0061 |
| | | | 382/167 |
| 2007/0176000 A1* | 8/2007 | Cattrone | G06K 1/121 |
| | | | 235/462.01 |
| 2010/0074443 A1* | 3/2010 | Ishii | H04N 1/32144 |
| | | | 380/243 |
| 2014/0355887 A1* | 12/2014 | Kurosawa | G06T 7/12 |
| | | | 382/199 |
| 2017/0262731 A1* | 9/2017 | Uetani | G06K 9/00765 |
| 2018/0012556 A1* | 1/2018 | Hsu | G09G 3/3677 |
| 2018/0330186 A1* | 11/2018 | Yabuuchi | H04N 1/00827 |
| 2019/0073278 A1* | 3/2019 | Ikeda | G06F 11/22 |
| 2019/0082172 A1* | 3/2019 | Uetani | H04N 17/002 |
| 2020/0134834 A1* | 4/2020 | Pao | G06T 11/60 |

* cited by examiner

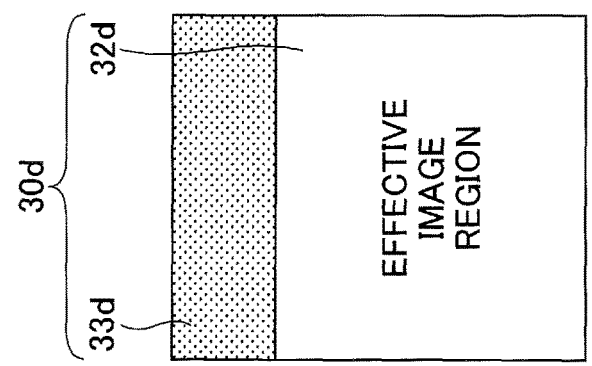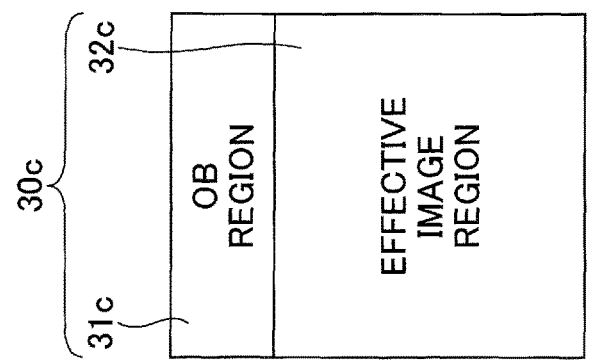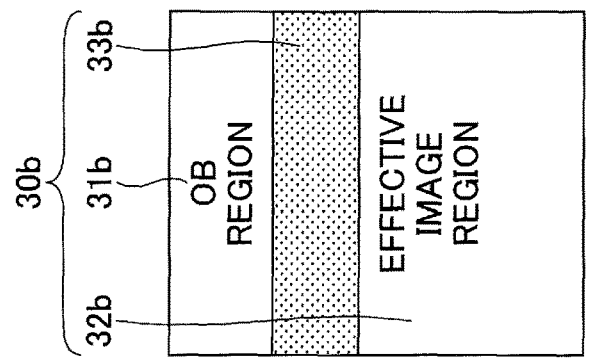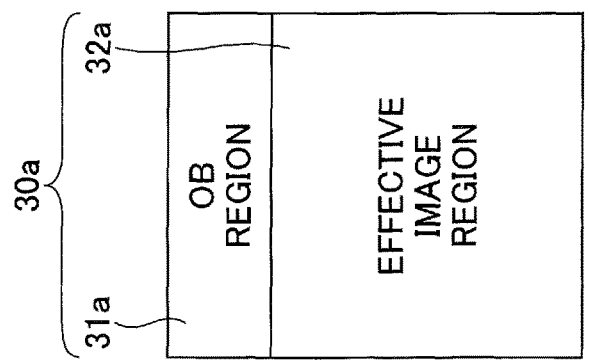

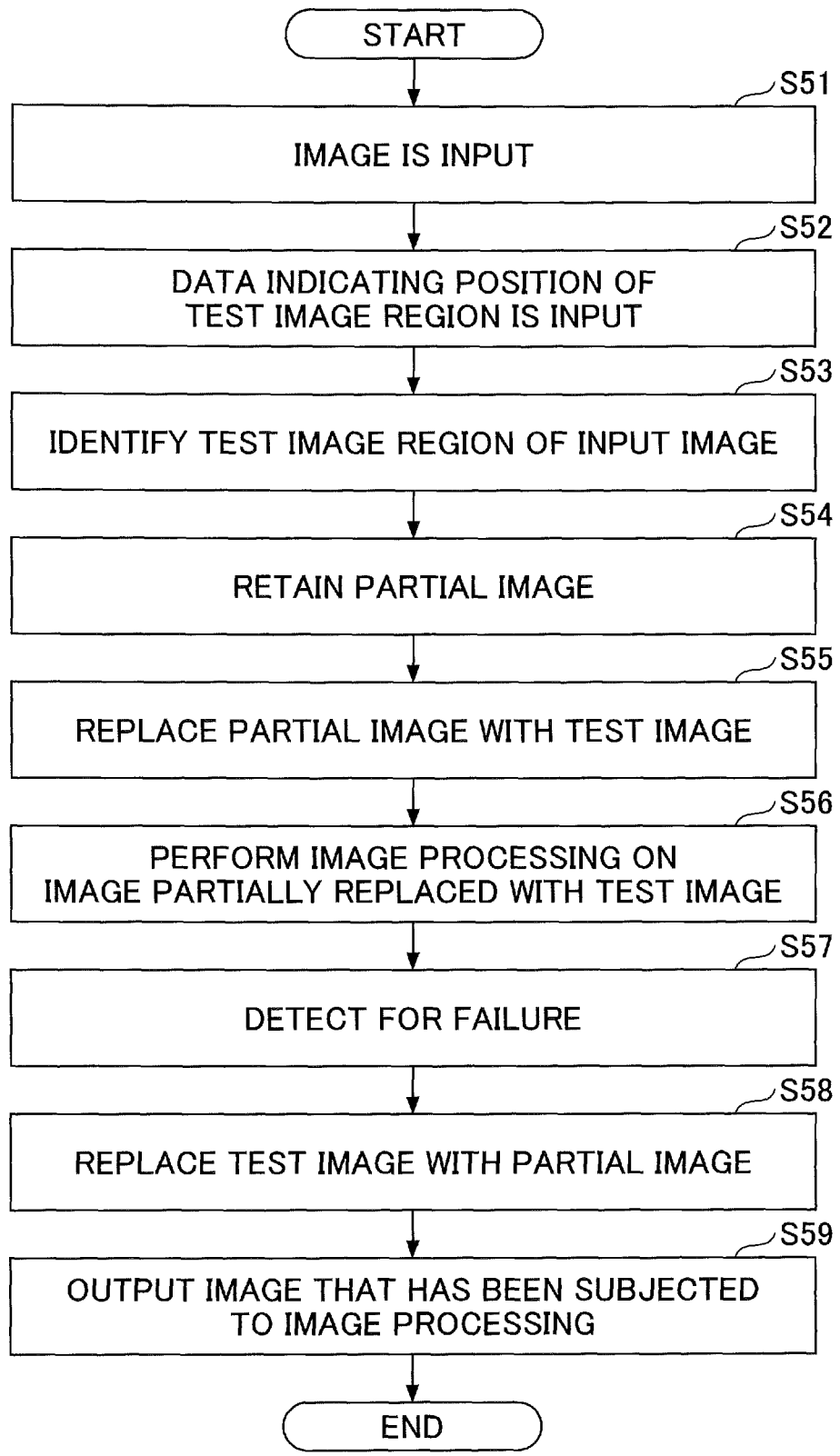

FIG.7
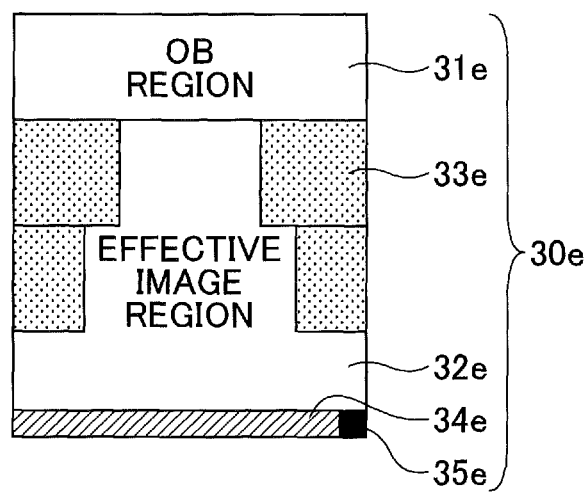
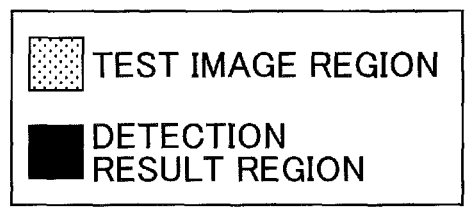

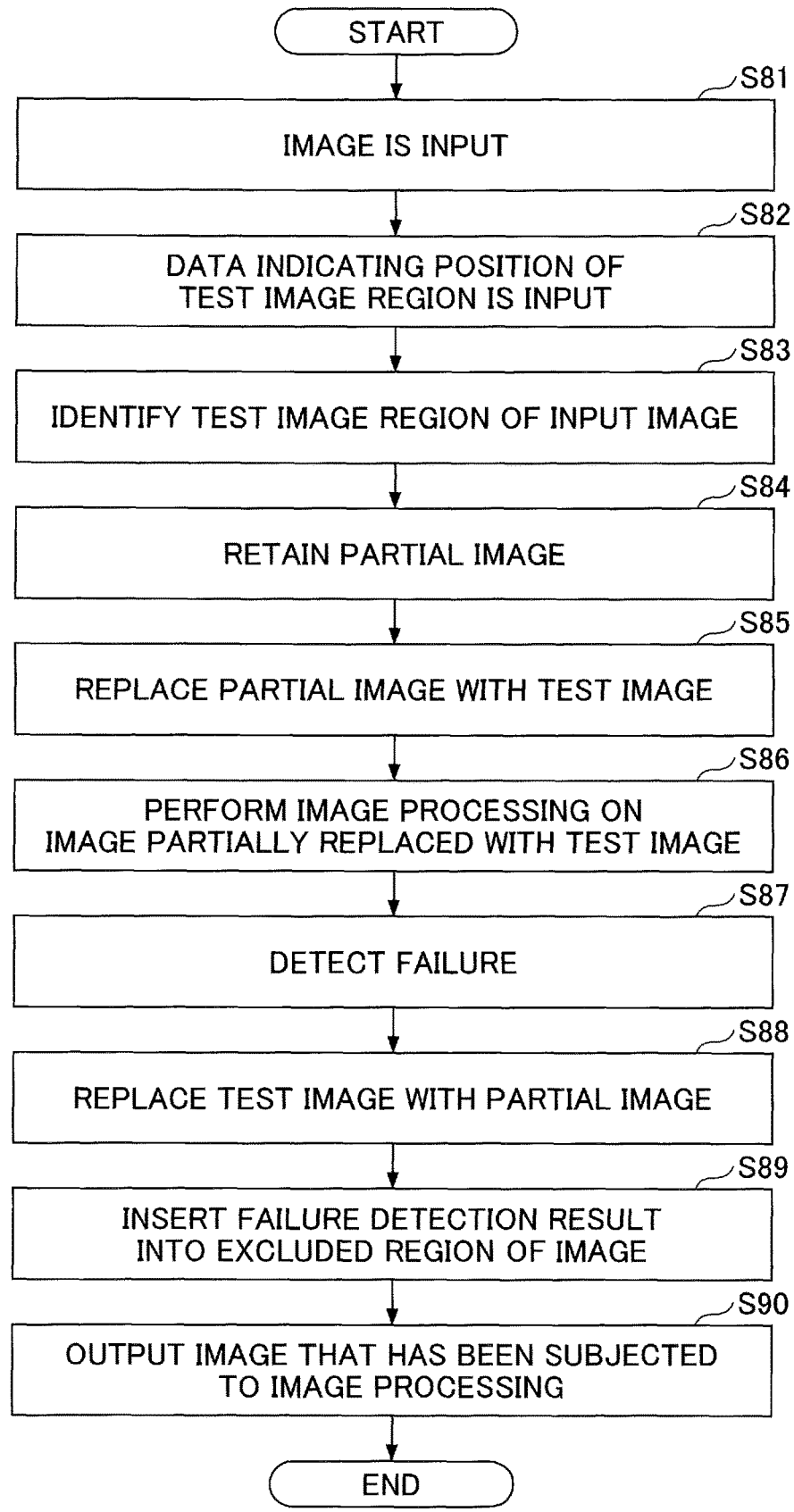

IMAGE PROCESSING APPARATUS, FAILURE DETECTION METHOD PERFORMED BY IMAGE PROCESSING APPARATUS, AND NON-TRANSITORY RECORDING MEDIUM

CROSS-REFERENCE TO RELATED APPLICATIONS

The present application claims priority under 35 U.S.C. § 119 to Japanese Patent Application No. 2018-248205, filed on Dec. 28, 2018, the entire contents of which are incorporated herein by reference.

BACKGROUND OF THE INVENTION

1. Field of the Invention

The disclosures herein generally relate to an image processing apparatus, a failure detection method performed by the image processing apparatus, and a non-transitory recording medium.

2. Description of the Related Art

In related-art image processing apparatuses used in the field of in-vehicle systems, a function to detect a failure is required to ensure functional safety.

As an image processing apparatus having a failure detection function, there is known an image processing apparatus that prepares test images and expected images for respective types of image processing, and compares the test images that have been subjected to image processing with the expected images, thereby detecting a failure of the image processing apparatus (see Patent Document 1, for example).

Further, there is known an image processing apparatus that inserts a test image into an image region (hereinafter referred to as a blanking region) that corresponds to a blanking interval of an input image, and detects a failure based on the test image that has been subjected to image processing (see Patent Document 2, for example).

However, the required size of a test image differs depending on the type of image processing. Thus, if a test image having a large size is inserted into a blanking region of an input image while an image processing apparatus is in operation, the frame rate may decrease.

RELATED-ART DOCUMENTS

Patent Documents

Patent Document 1: Japanese Unexamined Patent Application Publication No. H11-088585
Patent Document 2: Japanese Unexamined Patent Application Publication No. 2017-92757

SUMMARY OF THE INVENTION

According to an embodiment of the present invention, an image processing apparatus for execution of image processing on an input image is provided. The image processing apparatus includes a memory, and a processor coupled to the memory and configured to replace a partial image of a predetermined region within the input image with a test image, retain the partial image, detect presence or absence of a failure of the image processing apparatus based on the test image that has been subjected to the image processing, and replace the test image that has been subjected to the image processing with the retained partial image after detecting the presence or absence of the failure.

BRIEF DESCRIPTION OF THE DRAWINGS

Other objects and further features of the present invention will be apparent from the following detailed description when read in conjunction with the accompanying drawings, in which:

FIG. 3A through FIG. 3C are diagrams illustrating examples of input images partially replaced with test images, in which FIG. 3A illustrates an image input into the image processing apparatus, FIG. 3B illustrates a first example of an image partially replaced with a test image, and FIG. 3C illustrates a second example of an image partially replaced with test images;

FIG. 4A through FIG. 4D are diagrams illustrating an example in which an OB region is replaced with a test image;

FIG. 5 is a flowchart illustrating an example of the operation of the image processing apparatus according to the first embodiment;

FIG. 7 is a diagram illustrating an example of an image into which a failure detection result has been inserted; and FIG. 8 is a flowchart illustrating an example of the operation of the image processing apparatus according to the second embodiment.

DESCRIPTION OF THE EMBODIMENTS

Figure 1:
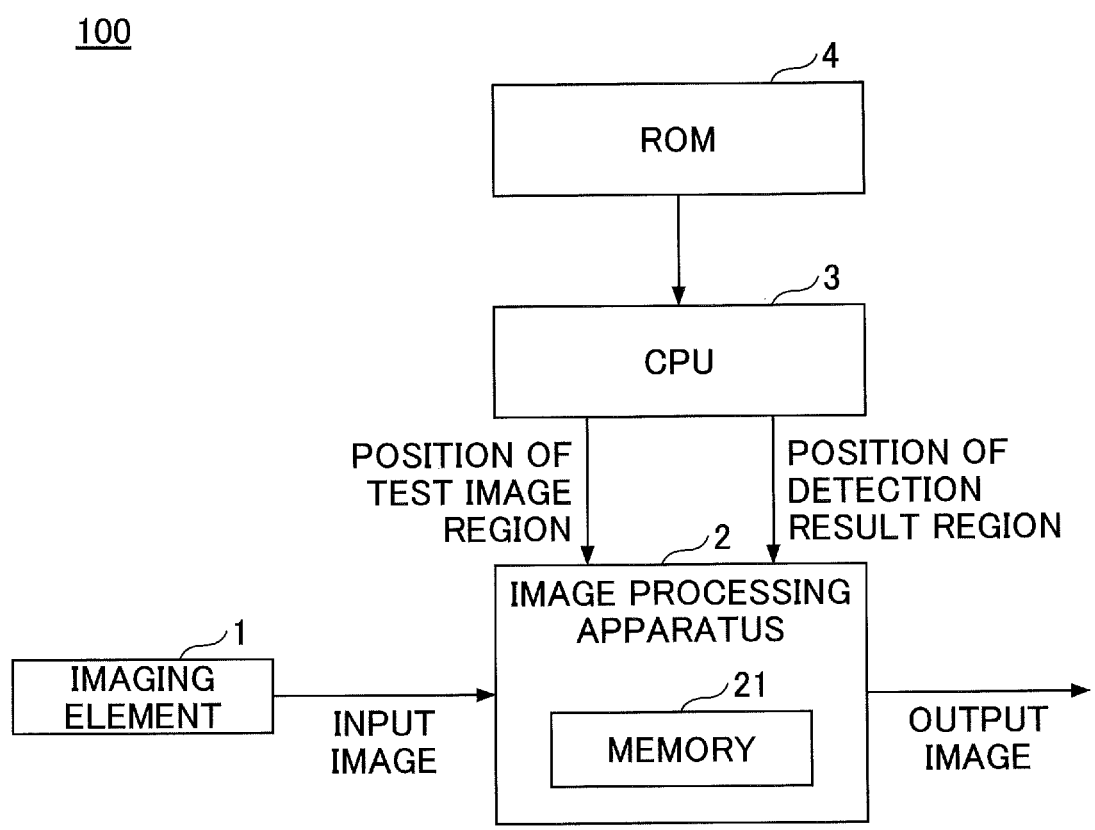
FIG. 1 is a block diagram illustrating an example of a hardware configuration of an image processing system according to an embodiment.

It is a general object of the present invention to detect a failure in various types of image processing without decreasing the frame rate of input images while an image processing apparatus is in operation.

In the following, embodiments of the present invention will be described with reference to the accompanying drawings. In the drawings, the same elements are denoted by the same numerals, and a duplicate description thereof may be omitted.

An image processing apparatus according to embodiments performs various types of image processing on images input from an imaging element. The image processing apparatus has a function to detect a failure of the image processing apparatus in the various types of image processing without decreasing the frame rate of the images input from the imaging element. In the following, an example of an image processing system including the image processing apparatus according to the embodiments will be described.

<Configuration of Image Processing System>

FIG. 1 is a block diagram illustrating an example of a hardware configuration of an image processing system according to an embodiment. As illustrated in FIG. 1, an image processing system 100 includes an imaging element 1, an image processing apparatus 2, a CPU 3, and a ROM 4.

The imaging element 1 is an image sensor, such as a charge-coupled device (CCD) or a complementary metal oxide semiconductor (CMOS) device, that captures an image and outputs the captured image to the image processing apparatus 2.

The image processing apparatus 2 is implemented by an integrated circuit, such as an application-specific integrated circuit (ASIC) or a field-programmable gate array (FPGA), that is capable of performing image processing. The image processing apparatus 2 performs predetermined types of image processing on images input from the imaging element 1, and outputs the processed images.

Further, the image processing apparatus 2 receives data indicating the position of a test image region and the position of a detection result region retained in the ROM 4 from the CPU 3, and uses the data when performing a failure detection process. The test image region will be described in detail in a first embodiment, and the detection result region will be described in detail in a second embodiment.

Further, the image processing apparatus 2 includes a memory 21 such as a semiconductor memory (storage device) that stores at least part of image data, input from the imaging element 1 for image processing, and also stores expected image data used for failure detection.

An image processed by the image processing apparatus 2 is output to an external apparatus. Examples of the external apparatus of the image processing apparatus 2 include a CPU, a personal computer (PC), a post-process image processing apparatus, and a display device.

The CPU 3 is an arithmetic unit that controls the overall operation of the image processing system 100. The ROM 4 is a non-volatile semiconductor memory (storage device) capable of retaining programs and data even after the power is turned off.

Note that the configuration of the image processing system 100 illustrated in FIG. 1 is merely an example, and the image processing system 100 may have another configuration.

First Embodiment

<Functional Configuration of Image Processing Apparatus According to First Embodiment>

Next, a functional configuration of the image processing apparatus 2 according to the first embodiment will be described.

Figure 2:
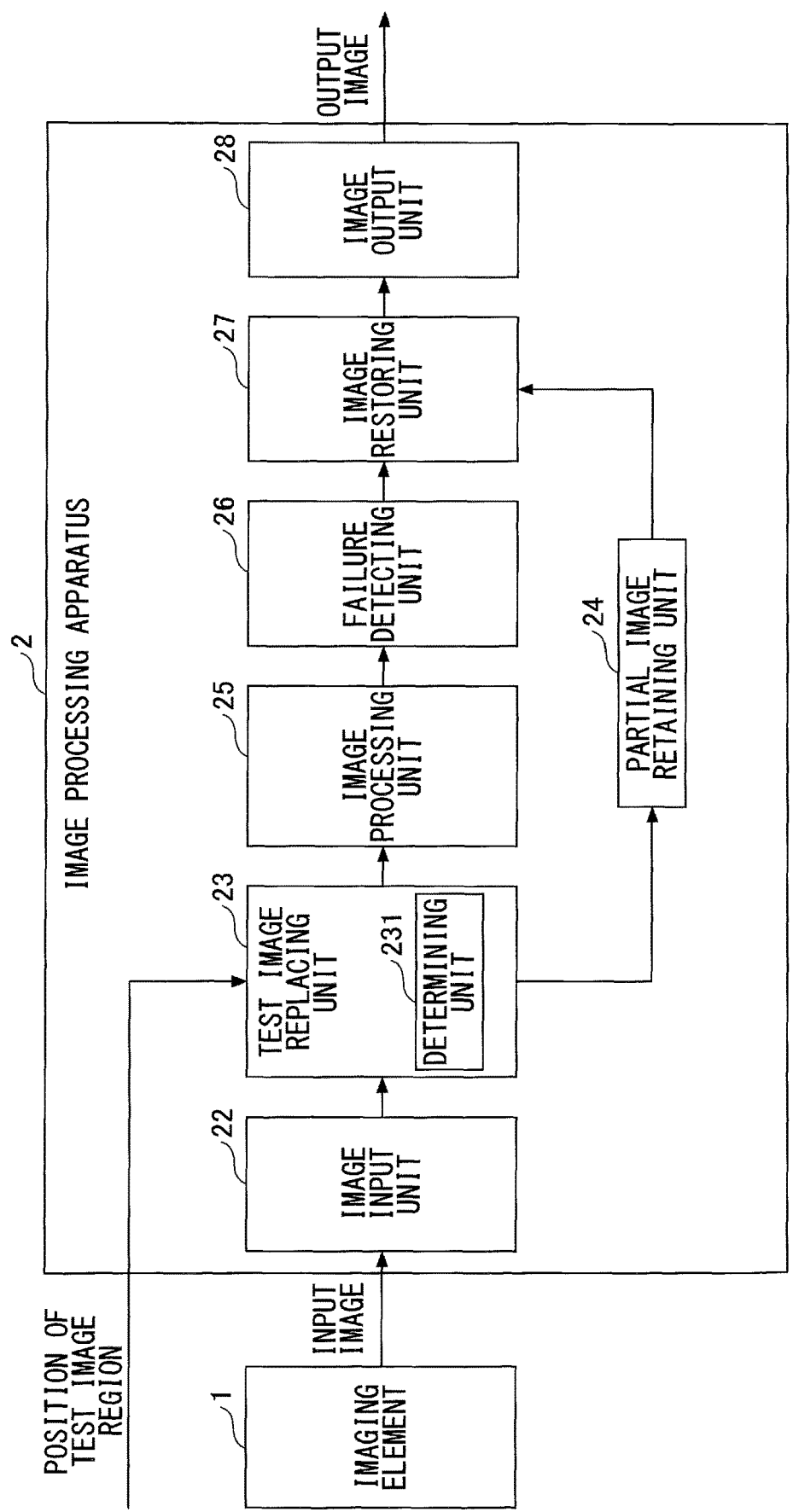
FIG. 2 is a block diagram illustrating an example of a functional configuration of an image processing apparatus according to a first embodiment.

FIG. 2 is a block diagram illustrating an example of the functional configuration of the image processing apparatus according to the first embodiment. All or some of the functional blocks illustrated in FIG. 2 may be functionally or physically separated or combined in any unit.

As illustrated in FIG. 2, the image processing apparatus 2 includes an image input unit 22, a test image replacing unit 23, a partial image retaining unit 24, an image processing unit 25, a failure detecting unit 26, an image restoring unit 27, and an image output unit 28.

A determining unit 231 is included in the test image replacing unit 23. An image is input into the determining unit 231 from the imaging element 1 via the image input unit 22, and coordinate data indicating the position of a predetermined test image region is input into the test image replacing unit 23 from the CPU 3. The determining unit 231 functions to determine whether each pixel forming an input image corresponds to a pixel (coordinates) to be replaced with a test image.

As used herein, the term "test image" refers to an image used to detect a failure of a processing circuit that performs various types of image processing. The test image may be any image that can readily detect a failure in accordance with the type of image processing targeted for failure detection. Examples of the test image include an image preliminarily captured by a camera or an incremental image in which the pixel brightness gradually increases in accordance with the coordinates.

The test image is an image having a size corresponding to approximately one to a few horizontal scan lines. The size of the test image varies depending on the type of image processing targeted for failure detection. For example, if failure detection is performed for image processing that uses a filter with taps for a 5×5 pixel window or for image processing that uses 5×5 neighboring pixels, the test image is required to have a size corresponding to at least five lines.

The test image may be generated by the test image replacing unit 23. Alternatively, the test image may be preliminarily stored in the memory 21, and acquired by being read by the test image replacing unit 23.

The test image region is a region where a part of an image input from the imaging element 1 is replaced with the test image. In the present embodiment, the test image region is a region (hereinafter referred to as an "excluded region") that is excluded from image processing by the image processing apparatus 2 or the image processing system 100. The test image region may be located at any position, as long as the test image region is located within the excluded region. Further, a plurality of test image regions may be present in one image frame. Further, the test image region may vary for each image frame input into the image processing apparatus 2.

The test image replacing unit 23 replaces a part of an input image with the test image, based on a result determined by the determining unit 231. Specifically, the test image replacing unit 23 extracts, from an input image, data of an image (hereinafter referred to as a "partial image") of a region to be replaced with the test image, and outputs the extracted data of the partial image to the partial image retaining unit 24. The partial image retaining unit 24 retains the data of the partial image. Further, the test image replacing unit 23 replaces the partial image with the test image. The test image replacing unit 23 outputs the image partially replaced with the test image to the image processing unit 25.

The partial image retaining unit 24 is implemented by the memory 21, and retains the data of the partial image, which has been input from the test image replacing unit 23. The partial image retaining unit 24 includes a storage capacity capable of at least storing image data having a-size corresponding to A×B, where A is a number obtained by adding 1 to the quotient (the number of lines) obtained by dividing a period of time required for the image processing unit 25 to perform image processing on a test image by a blanking interval, and B is the number of pixels in the horizontal direction of an image input from the imaging element 1. For example, if the number of pixels in the horizontal direction of an image input from the imaging element 1 is 1,000 and a period of time corresponding to 2 lines is required for the image processing unit 25 to perform image processing on a test image, the partial image retaining unit 24 can at least store image data having a size of (2+1)×1000. Note that the blanking interval is a period of time required for horizontal scanning of one line of an image input from the imaging element 1.

The image processing unit 25 functions to perform image processing on an input image. An image partially replaced with the test image is input into the image processing unit 25, and the image processing unit 25 performs image processing, targeted for failure detection, on the image partially replaced with the test image, and outputs the processed image to the failure detecting unit 26.

The image processing unit 25 performs the image processing on the entire image partially replaced with the test image. Therefore, failure detection can be performed while the image processing apparatus 2 is in operation. Namely, in the entire image, a processing result obtained for the test image can be used for failure detection, and a processing result obtained for the image other than the test image can be used as an image that has been subjected to image processing by the image processing apparatus 2. Note that if the image processing apparatus 2 is not in operation at the time of failure detection, the image processing unit 25 may perform image processing on the test image only.

The image that has been subjected to the image processing is input into the failure detecting unit 26, and the failure detecting unit 26 functions to compare the test image with a predetermined expected image, and detects a failure of the image processing unit 25 based on the compared results.

Specifically, the failure detecting unit 26 performs a differential process between the test image that has been subjected to the image processing and the expected image to obtain difference values. If the maximum value of the difference values exceeds a predetermined threshold, the failure detecting unit 26 determines that there is a failure, and detects the failure. The failure detecting unit 26 causes a register to retain the detection result, and outputs the image, which has been input from the image processing unit 25, to the image restoring unit 27. A method for failure detection is not limited to the above-described method, and any other known method for failure detection may be employed.

The image restoring unit 27 reads the data of the partial image retained by the partial image retaining unit 24, and replaces the test image, of the image input from the failure detecting unit 26, with the partial image. Accordingly, the region replaced with the test image for failure detection can be restored to the original state. The restored image is output from the image processing apparatus 2 to the external apparatus via the image output unit 28.

Figure 3A:
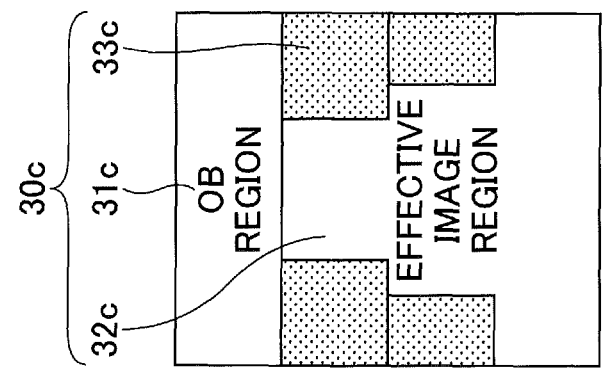
Figure 3B:
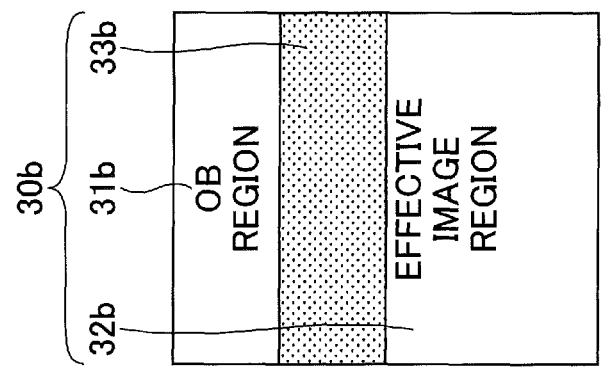
Figure 3C:
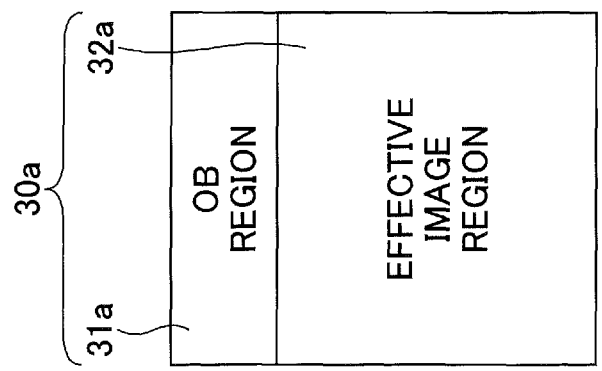

FIG. 3A through FIG. 3C are diagrams illustrating examples of input images partially replaced with test images. FIG. 3A illustrates an image input into the image processing apparatus, FIG. 3B illustrates a first example of an image partially replaced with a test image, and FIG. 3C illustrates a second example of an image partially replaced with test images.

In FIG. 3A, an image 30*a* includes an optical blanking (OB) region 31*a* and an effective image region 32*a*. The OB region 31*a* is a region that corresponds to a blanking interval of the image (moving image) input into the image processing apparatus 2, and is not visually recognized as an image. The effective image region 32*a* is a region that is visually recognized as an image.

In FIG. 3B, an image 30*b* includes an OB region 31*b*, an effective image region 32*b*, and a test image region 33*b* provided between the OB region 31*b* and the effective image region 32*b*.

The OB region 31*b* may be replaced with a test image, but the size (the number of lines) of the OB region 31*b* may be different depending on the specification of the imaging element 1, and further, the test image may require a large number of lines in accordance with the type of image processing.

For example, in the case of image processing that uses a filter with taps for a 5×5 pixel window or image processing that uses 5×5 neighboring pixels, the test image is required to have a size corresponding to at least five lines. Thus, if the OB region 31*b* has one line only, failure detection would not be able to be performed for the above-described image processing.

In light of the above, in the present embodiment, at least a part of an excluded region within an input image is replaced with the test image, and is used as a test image region.

The excluded region may differ for each image processing apparatus 2 or for each image processing system 100, or there may a plurality of separated excluded regions. Therefore, as illustrated in FIG. 3C, a plurality of regions in an effective image region 32*c* may be replaced with test images as test image regions 33*c*. Further, a plurality of separate regions including an OB region 31*c* may be replaced with test images as the test image regions 33*c*.

A region to be replaced with the test image can be determined in accordance with the specification of the image processing apparatus 2 or the specification of the image processing system 100. Therefore, the region replaced with the test image can be predetermined, and data indicating the position of the test image region can be preliminarily input into the image processing apparatus 2 from the CPU 3. Accordingly, the image processing apparatus 2 can replace a partial image of the predetermined region in the input image with the test image.

FIG. 4A through FIG. 4D are drawings illustrating an example in which an OB region is replaced with a test image, illustrated in order of passage of time.

First, an image 30*a* including an OB region 31*a* and an effective image region 32*a* is input into the image processing apparatus 2 from the imaging element 1. In the related art, the OB region 31*a* is a region used to determine a pixel value at which a black color is detected by the imaging element 1. The brightness value of pixels in the OB region 31*a* is preferably zero. However, because of white noise, the brightness value actually becomes zero or more. For this reason, in the image 30*a* (such as the first image frame) initially input into the image processing apparatus 2, the OB region 31*a* may be used to perform a process for detecting a white noise level.

In this case, the OB region is unable to be replaced with a test image for failure detection. Thus, as illustrated in FIG. 4B, a region between an OB region 31*b* and an effective image region 32*b* of an image 30*b* is replaced with a test image region 33*b*. Then, in the image 30*b*, the process for detecting a white noise level is performed by using the OB region 31*b*, and the failure detection process is performed by using the test image region 33*b*.

In an image 30*c* input into the image processing apparatus 2 as the next image frame, the process for detecting a white noise level has already been performed and is thus not required to be performed this time. Therefore, an OB region 31*c* can be used as a test image region. An image 30*d* is an image in which the OB region is replaced with a test image region 33*d*. The failure detection process can be performed by using the above-described image 30*d*.

As described above, the failure detection process can be performed by varying a test image region on a per-image-frame basis. In the example of FIG. 4B, the region between the OB region 31*b* and the effective image region is replaced with the test image region; however, the present invention is not limited thereto. As described in FIG. 3C, a plurality of regions may be replaced with test image regions.

Further, a region replaced with a test image region on a per-frame basis is not required to include an OB region. For example, in a predetermined image frame, the image may be partially replaced with a test image as with the test image region 33b of FIG. 3B, and in another image frame, the image may be partially replaced with test images as with the test image regions 33c of FIG. 3C.

<Operation of Image Processing Apparatus According to First Embodiment>

FIG. 5 is a flowchart illustrating an example of the operation of the image processing apparatus according to the first embodiment.

First, in step S51, an image is input into the image input unit 22 from the imaging element 1, and the image input unit 22 outputs the image to the test image replacing unit 23.

Next, in step S52, data indicating the position of a test image region is input into the test image replacing unit 23 from the CPU 3.

Next, in step S53, the determining unit 231 determines whether each pixel forming the input image corresponds to a pixel (coordinates) to be replaced with a test image, and identify the test image region.

Next, in step S54, the test image replacing unit 23 extracts, from the input image, data of a partial image of a region to be replaced with the test image, and outputs the extracted data of the partial image to the partial image retaining unit 24. The partial image retaining unit 24 retains the data of the partial image.

Next, in step S55, the test image replacing unit 23 replaces the partial image with the test image, and outputs the image partially replaced with the test image to the image processing unit 25.

Next, in step S56, the image processing unit 25 performs image processing on the image partially replaced with the test image, which has been input from the test image replacing unit 23, and outputs the image that has been subjected to the image processing to the failure detecting unit 26.

Next, in step S57, the failure detecting unit 26 compares the test image, of the image that has been subjected to the image processing and input from the image processing unit 25, with a predetermined expected image, and detects for failure. The failure detecting unit 26 causes the register to retain the detection result, and outputs the image, which has been subjected to the image processing and input from the image processing unit 25, to the image restoring unit 27.

Next, in step S58, the image restoring unit 27 reads the partial image data from the partial image retaining unit 24, and replaces the test image, of the image input from the image processing unit 25, with the partial image. Then, the image restoring unit 27 outputs the image to the image output unit 28.

Next, in step S59, the image output unit 28 outputs the image, input from the image restoring unit 27, to the external apparatus of the image processing apparatus 2.

In this manner, the image processing apparatus 2 can perform both the image processing and the failure detection process on the image input from the imaging element 1.

<Effects>

In fields requiring functional safety such as the field of in-vehicle systems, it is required for an image processing apparatus to have a function to detect a failure that has occurred while the image processing apparatus is in operation. There is known an image processing apparatus that detects a failure of the image processing apparatus by using a test image dedicated for each type of image processing.

The operating rate of various types of image processing apparatuses is preferably nearly 100% (that is, almost all the image processing apparatuses are properly operating). Therefore, it is preferable to prepare an appropriate test image in accordance with the type of image processing. Further, in the case of image processing that uses a filter with a plurality of pixels or image processing that uses neighboring pixels, a large test image having several tens of lines may be required.

The following are example methods in which such a test image is used for failure detection.

In one method, immediately after startup of an image processing apparatus, image processing, targeted for failure detection, is performed on a test image prepared beforehand or a test image generated within the image processing apparatus, and the test image that has been subjected to the image processing is compared to a predetermined expected image. In this way, a failure of the image processing apparatus is detected.

In the above method, any size of the test image can be used, but the timing at which to perform failure detection is limited, namely the failure detection can be performed only immediately after the startup of the image processing apparatus. That is, in the above method, there may be a case where failure detection would not be able to be performed while the image processing apparatus is in operation.

Further, in another method, while an image processing apparatus is in operation, a test image is inserted into a blanking region within an image frame input into the image processing apparatus, and failure detection is performed on the inserted test image.

In the above method, failure detection can be performed at any time without time limitation. However, if the size of the test image is large, the test image would not be able to be inserted into the blanking region in some cases. Conversely, if the blanking region is made large such that the large test image can be inserted, the blanking interval would increase, resulting in a decrease in the frame rate.

In the present embodiment, an excluded region within an image input into the image processing apparatus 2 is replaced with a test image, and the test image that has been subjected to the image processing is compared to an expected image. In this manner, a failure of the image processing apparatus is detected. Because the excluded region is utilized in addition to the blanking region, the input image can be partially replaced with the test image without increasing the blanking interval, even if the test image is required to have a large size. Further, failure detection can be performed by using the test image without resulting in a decrease in the frame rate.

Further, the excluded region is a region not intended to be utilized in the image processing apparatus 2 or the image processing system 100. Therefore, failure detection can be performed for each input image while the image processing apparatus 2 is in operation.

As described above, a failure can be detected in various types of image processing without decreasing the frame rate of input images while the image processing apparatus 2 is in operation. Accordingly, the image processing apparatus with a high operating rate (high failure detection rate) can be provided.

Further, in the present embodiment, the partial image retaining unit 24 may at least retain image data having a size corresponding to A×B, where A is a number obtained by adding 1 to the quotient (the number of lines) obtained by dividing a period of time required for the image processing unit 25 to perform image processing on a test image by a blanking interval, and B is the number of pixels in the horizontal direction of an image input from the imaging element 1. Accordingly, the storage capacity of the memory 21 included in the image processing apparatus 2 can be reduced.

Further, in the present embodiment, an example in which processes are performed on a per image basis has been described; however, the above-described processes may be performed for each pixel of an image input into the image processing apparatus 2. In this case, in FIG. 2, pixel data (a brightness value) is input into the image processing apparatus 2 from the imaging element 1, the processing units perform processes on the pixel image, and the processed pixel data is output from the image processing apparatus 2.

More specifically, the determining unit 231 determines whether pixel data, which has been input, corresponds to a pixel of a test image region. When the determining unit 231 determines that the pixel data corresponds to the pixel of the test image region, the test image replacing unit 23, the image processing unit 25, the failure detecting unit 26, and the image restoring unit 27 perform processes on the input pixel data. Then, the processed pixel data is output from the image processing apparatus 2 via the image output unit 28.

Conversely, when the determining unit 231 determines that the pixel data does not correspond to the pixel of the test image region, the image processing unit 25 performs image processing on the input pixel data, and the pixel data that has been subjected to image processing is output from the image processing apparatus 2 via the image output unit 28. Namely, the ordinary image processing is performed without performing the failure detection process.

Second Embodiment

Next, an image processing apparatus according to the second embodiment will be described. A description of the same elements as those of the above-described embodiment will not be provided.

<Functional Configuration of Image Processing Apparatus According to Second Embodiment>

Figure 6:
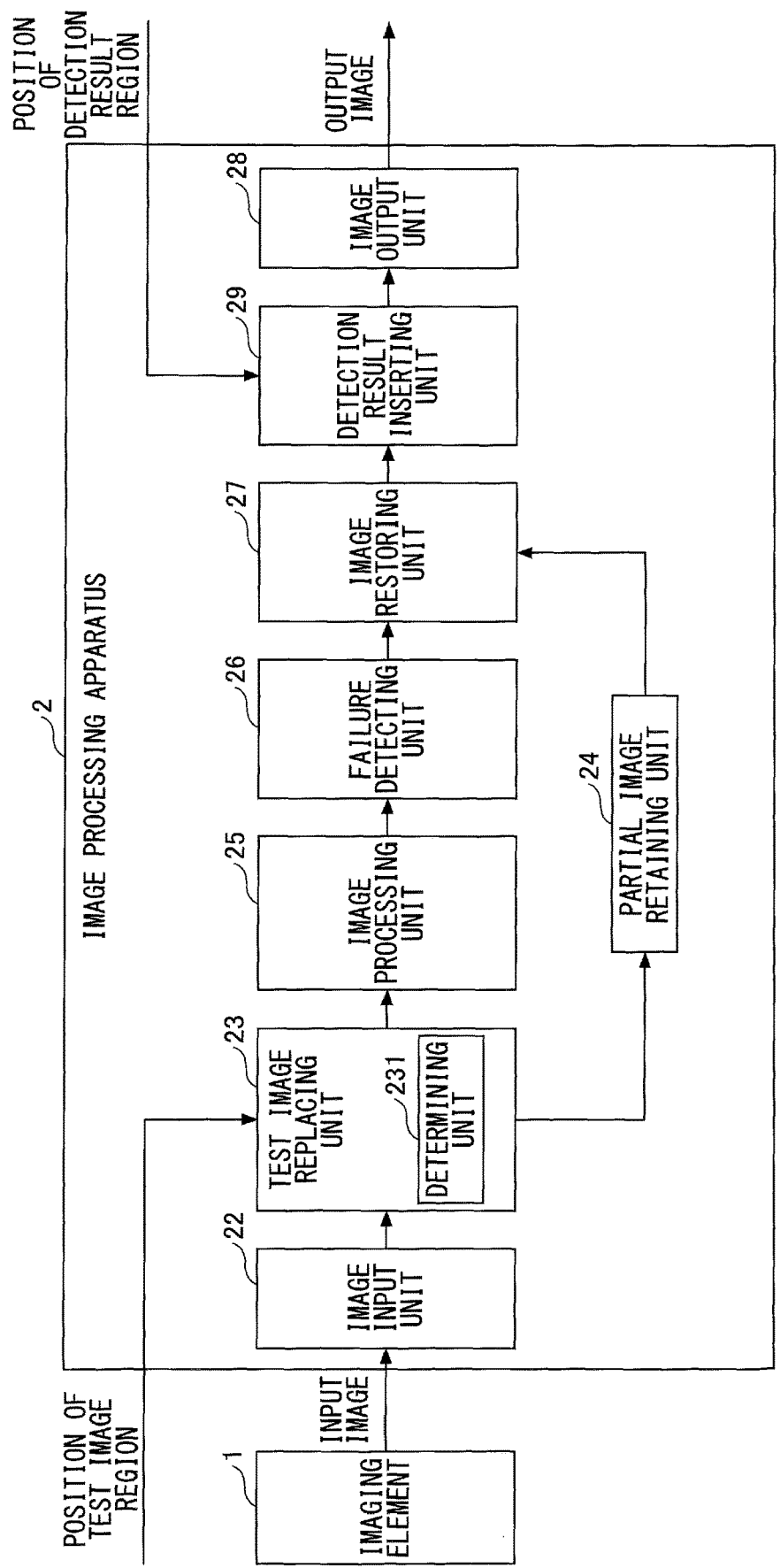
FIG. 6 is a block diagram illustrating a functional configuration of an image processing apparatus according to a second embodiment.

FIG. 6 is a block diagram illustrating a functional configuration of an image processing apparatus according to the second embodiment. As illustrated in FIG. 6, an image processing apparatus 2a includes a detection result inserting unit 29.

The detection result inserting unit 29 reads a failure detection result, stored in the register by the failure detecting unit 26. Further, from CPU 3, the detection result inserting unit 29 receives data indicating the position of a detection result region of an image input from the image restoring unit 27. Then, the detection result inserting unit 29 inserts data indicating the failure detection result into the detection result region of the image input from the image restoring unit 27.

The detection result region is an excluded region that is excluded from image processing by the image processing apparatus 2 or the image processing system 100, and is also located at a position having a coordinate larger than the maximum coordinate of a test image region in the vertical scanning direction of an image. The detection result region is predetermined and retained in a memory such as the ROM 4.

FIG. 7 is a diagram illustrating an example of an image into which a failure detection result has been inserted. An image 30e includes an OB region 31e, an effective image region 32e, test image regions 33e, an excluded region 34e, and a detection result region 35e.

As illustrated in FIG. 7, the detection result region 35e is a region that is a part of the excluded region 34e and located at a position having a coordinate larger than the maximum coordinate of the test image region 33e in the vertical scanning direction of the image 30e. In FIG. 7, coordinates in the vertical scanning direction of the image 30e increase towards the downward direction.

An external apparatus of the image processing apparatus 2a, such as a CPU or a post-process image processing apparatus, can readily determine whether the image processing apparatus 2a has a failure by referring to the detection result region 35e included in the image received from the image processing apparatus 2a.

<Operation of Image Processing Apparatus According to Second Embodiment>

FIG. 8 is a flowchart illustrating an example of the operation of the image processing apparatus according to the second embodiment. Steps S81 through S88 are the same as steps S51 through S58, and thus a description thereof is omitted.

In step S89, the detection result inserting unit 29 reads a failure detection result, stored in the register by the failure detecting unit 26. Further, from the CPU 3, the detection result inserting unit 29 receives data indicating the position of a failure detection result region within an image input from the image restoring unit 27. Next, the detection result inserting unit 29 inserts data indicating the failure detection result into the detection result region of the image input from the image restoring unit 27. Then, the image into which the data indicating the failure detection result has been inserted is output to the image output unit 28.

Next, in step S90, the image output unit 28 outputs the image, input from the detection result inserting unit 29, to the external apparatus of the image processing apparatus 2a.

In this manner, the image processing apparatus 2a can perform both the image processing and the failure detection process on the input image, and can also insert the data indicating the failure detection result into the partial region of the image.

As described above, the image processing apparatus 2a according to the second embodiment is capable of inserting data indicating a failure detection result into a partial region of an image, and outputting the image to the external apparatus of the image processing apparatus 2a. The external apparatus can readily determine the presence or absence of a failure of the image processing apparatus 2a by referring to the data inserted into the detection result region of the image received from the image processing apparatus 2a. Further, the image processing apparatus 2a can also send an alert indicating a failure to a user.

Further, although specific embodiments have been described above, the present invention is not limited to the above-described embodiments. Variations and modifications may be made to the described subject matter without departing from the scope of the invention as set forth in the claims.

Further, it is possible to select either the first embodiment or the second embodiment in accordance with the specification of the image processing system 100. In other words, it is possible to select whether or not to include the detection result inserting unit 29 in the image processing apparatus, in accordance with the specification of the image processing system 100.

Further, the above-described embodiments include a failure detection method performed by the image processing apparatus. For example, the failure detection method performed by the image processing apparatus includes replacing a partial image of a predetermined region within the input image with a test image; retaining the partial image; detecting presence or absence of a failure of the image processing apparatus based on the test image that has been subjected to the image processing; and replacing the test image that has been subjected to the image processing with the retained partial image, after detecting the presence or absence of the failure.

With the above-described failure detection method, effects similar to the above-described image processing apparatus can be obtained.

Further, the above-described embodiments include a non-transitory recording medium storing a program. For example, the non-transitory recording medium storing a program includes replacing a partial image of a predetermined region within the input image with a test image; retaining the partial image; detecting presence or absence of a failure of the image processing apparatus based on the test image that has been subjected to the image processing; and replacing the test image that has been subjected to the image processing with the retained partial image, after detecting the presence or absence of the failure.

With the above-described non-transitory recording medium, effects similar to the above-described image processing apparatus can be obtained.

According to an embodiment of the present invention, it is possible to detect a failure in various types of image processing without decreasing the frame rate of input images while an image processing apparatus is in operation.

What is claimed is:

1. An image processing apparatus for execution of image processing on an input image, the image processing apparatus comprising:
    a memory; and
    a processor coupled to the memory and configured to
    replace a partial image of a predetermined region within the input image with a test image,
    retain the partial image,
    detect presence or absence of a failure of the image processing apparatus based on the test image that has been subjected to the image processing, and
    replace the test image that has been subjected to the image processing with the retained partial image, after detecting the presence or absence of the failure,
    wherein the processor at least retains image data having a size corresponding to A×B, where A is a number that is obtained by adding 1 to a quotient obtained by dividing a period of time required for the image processing on the test image by a blanking interval, and B is a number of pixels in a horizontal direction of the input image.

2. The image processing apparatus according to claim 1, wherein the processor is further configured to insert data indicating the presence or absence of the failure into another predetermined region within the input image.

3. The image processing apparatus according to claim 1, wherein the processor is further configured to determine whether each pixel forming the input image is a pixel forming the partial image.

4. The image processing apparatus according to claim 1, wherein the processor is configured to automatically replace the test image that has been subjected to the image processing with the retained partial image without an instruction from a user of the image processing apparatus.

5. A failure detection method performed by an image processing apparatus for execution of image processing on an input image, the method comprising:
    replacing a partial image of a predetermined region within the input image with a test image;
    retaining the partial image;
    detecting presence or absence of a failure of the image processing apparatus based on the test image that has been subjected to the image processing; and
    replacing the test image that has been subjected to the image processing with the retained partial image, after detecting the presence or absence of the failure,
    wherein the method further comprises at least retaining image data having a size corresponding to A×B, where A is a number that is obtained by adding 1 to a quotient obtained by dividing a period of time required for the image processing on the test image by a blanking interval, and B is a number of pixels in a horizontal direction of the input image.

6. A non-transitory recording medium storing a program for causing a computer, of an image processing apparatus for execution of image processing on an input image, to execute a process, the process comprising:
    replacing a partial image of a predetermined region within the input image with a test image;
    retaining the partial image;
    detecting presence or absence of a failure of the image processing apparatus based on the test image that has been subjected to the image processing; and
    replacing the test image that has been subjected to the image processing with the retained partial image, after detecting the presence or absence of the failure,
    wherein the process further comprises at least retaining image data having a size corresponding to A×B, where A is a number that is obtained by adding 1 to a quotient obtained by dividing a period of time required for the image processing on the test image by a blanking interval, and B is a number of pixels in a horizontal direction of the input image.

* * * * *